M. SETTER.
PISTON RING.
APPLICATION FILED NOV. 14, 1914.
1,139,811. Patented May 18, 1915.
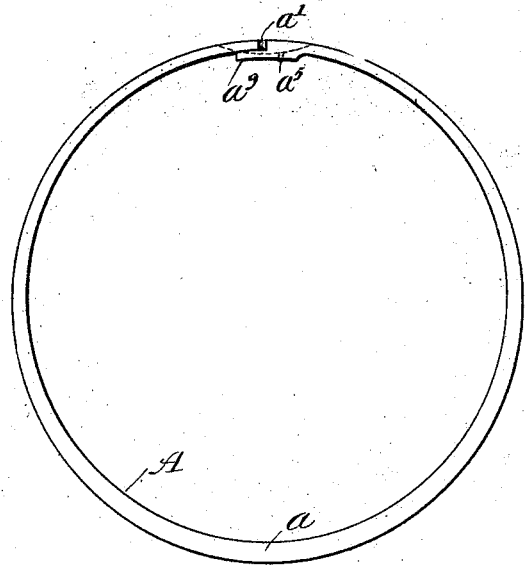
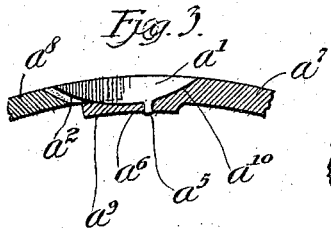
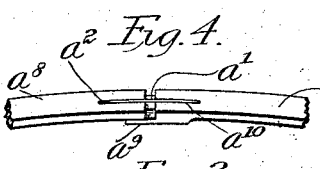
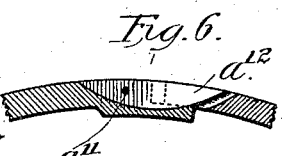
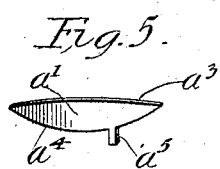
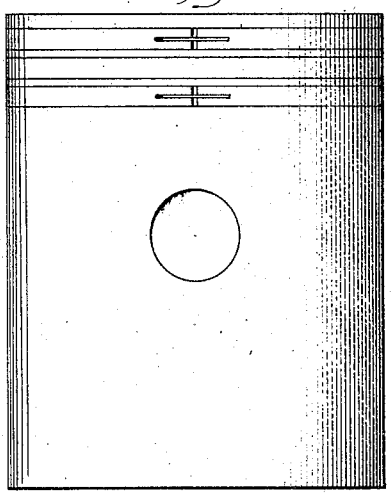
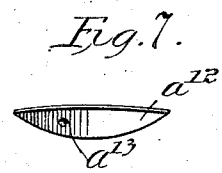
Witnesses:
Inventor:
Michael Setter
by Arthur F. Durand
Atty.

UNITED STATES PATENT OFFICE.

MICHAEL SETTER, OF CHICAGO, ILLINOIS.

PISTON-RING.

1,139,811.  Specification of Letters Patent.  Patented May 18, 1915.

Application filed November 14, 1914. Serial No. 872,078.

*To all whom it may concern:*

Be it known that I, MICHAEL SETTER, a citizen of the United States of America, and resident of Chicago, Cook county, Illinois, (care of Automatic Electric Co., 1001 West Van Buren street,) have invented a certain new and useful Improvement in Piston-Rings, of which the following is a specification.

My invention relates to piston rings in general, but more particularly to those for use in gas engines, or other internal combustion engines.

Generally stated, the object of my invention is to provide a piston ring having provisions for preventing leakage at the joint or split which is ordinarily formed in one side thereof, and which is necessary in order to enable the ring to automatically take up wear; to provide the said joint or split with a tongue and groove formation of such character that the opening of the joint will not form a passage through which the pressure may escape; and to provide certain details and features of construction tending to increase the general efficiency of a piston ring of this particular character, as well as to reduce the cost and render practical the manufacture thereof.

To these and other useful ends my invention consists in matters hereinafter set forth and claimed.

In the accompanying drawings—Figure 1 is a plan view of a piston ring provided with a joint or split embodying the principles of my invention. Fig. 2 is a side elevation of a piston provided with springy or resilient rings of the character shown and described. Fig. 3 is an enlarged sectional view of the said joint or split portion of the ring. Fig. 4 is a perspective of the part shown in Fig. 3. Fig. 5 is a perspective of the tongue shown in the preceding figures. Figs. 6 and 7 are views similar to Figs. 3 and 5, and illustrate another form of my invention.

As thus illustrated, and referring to Figs. 1 to 5 inclusive, my invention comprises a springy or resilient ring A which is preferably thicker at $a$ than at the opposite side thereof, in order that the action of the ring may be uniform, or substantially so, throughout the circumference thereof. At the said opposite side the ring is provided with a joint or split for enabling the ring to expand and take up wear in the usual and well known manner; but in accordance with my invention this joint is formed by a tongue $a^1$ which engages the groove $a^2$, whereby the joint may open without forming a passage through which the pressure could escape to the other side of the piston. The said tongue has an outer edge $a^3$ which conforms to the curvature of the ring when the joint is closed, and an inner edge $a^4$ which is formed on the line of a circle struck for an axis outside of the ring. A pin or rivet $a^5$ is formed integral with the inner edge of the tongue and is inserted through an opening $a^6$ in the ring and is then riveted over at its end. It will be seen that the end portion $a^7$ of the ring is somewhat thicker than the end portion $a^8$, and that said portion $a^7$ is provided with a portion $a^9$ which overlaps the inner surface of the portion $a^8$, thereby forming a lap joint in addition to the tongue and groove joint. The portions $a^7$ and $a^9$ of the ring are formed with a groove $a^{10}$ which conforms to the curvature of the inner edge $a^4$ of the tongue, and which is in reality a continuation of the groove $a^2$. The entire groove thus extending from one side of the joint to the other may be formed by a tool in the form of a rotary disk having its edge formed with cutting teeth, said disk being rotated to cut the groove. In this way, therefore, the bottom of said groove conforms throughout its length to the curvature of the inner edge $a^4$ of the tongue, and the portion $a^9$ serves to close the bottom of said groove. After being inserted in place, the end of the pin $a^5$ is then riveted over, as shown in Fig. 3, to hold the tongue in place.

As shown in Figs. 6 and 7, the construction is exactly the same as that shown in Figs. 3 and 5, except that a transverse locking pin $a^{11}$ is employed as a substitute for the previously described pin or rivet $a^5$, this pin $a^{11}$ being in the form of a ring extending through the tongue $a^{12}$ and through the portions of the ring at each side thereof, the ends of this rivet being upset to hold it in place. For this purpose the tongue $a^{12}$, which has outer and inner edges exactly like those of the tongue $a^1$, is provided with an opening $a^{13}$ through which the said pin or rivet is inserted. It will also be understood that the portions of the ring at each side of this tongue $a^{12}$ are provided with openings which register with the opening $a^{13}$ for the accommodation of said pin or rivet.

In either case, therefore, the tongue and groove joint is formed by a tongue consisting of a separate piece of metal which is held in place by a pin or rivet. The groove for the tongue is close fitting and prevents leakage, and the tongue is of a length to prevent the formation of any cracks or crevices or passages through which the pressure could escape when the joint opens to take up wear. The tongue can be made of any suitable metal, such as hard steel, if necessary or desirable, and the ring can be constructed of the usual grade of metal employed for this purpose. The cutting of the groove which extends from one side of the joint to the other is accomplished in an economical and convenient manner, by using a rotary cutting tool of the character previously explained. Ordinarily, these piston rings, especially those for internal combustion engines, are made of cast iron. The tongue shown and described can be secured in place in various ways, but it is found that some methods are preferable to others, inasmuch as brazing or welding, for example, tends to harden the cast iron. This hardening of the ring would be objectionable, inasmuch as it would be liable to scrape or cut the inner surface of the cylinder, and it is for this reason that preferably some means are employed for fastening the tongue in place without hardening the ring, such, for example, as the pin or rivet shown and described. This tongue can be made of any suitable metal, and the formation of this tongue from a separate piece of metal is found to be of considerable advantage from a manufacturing standpoint, as it tends to facilitate the work by machinery and otherwise involved in the production of a joint of this character.

What I claim as my invention is:—

1. A split piston ring provided with a groove extending across the joint thereof, at a point between the sides of the ring, a tongue inserted in said groove, and means for rigidly securing said tongue at one side only of said joint, the tongue being a sliding fit in the groove at the other side of said joint.

2. A split piston ring provided with a groove extending across the joint thereof, a tongue in said groove, and means for securing said tongue at one side of said joint, said groove having the bottom thereof formed on the line of a true circle struck from an axis outside of said ring, when said joint is closed, and said tongue having its opposite edges curved to conform to said circle and the periphery of the ring.

3. A split piston ring provided with a groove extending across the joint thereof, a tongue in said groove, and means for securing said tongue at one side of said joint, said ring having a portion extending along the inner edge of said tongue to overlap the joint.

4. A split piston ring provided with a groove extending across the joint thereof, at a point between the sides of the ring, a tongue inserted in said groove, and means for rigidly securing said tongue at one side only of said joint, the tongue being a sliding fit in the groove at the other side of said joint, said means consisting of a rivet extending through a portion of the ring, said rivet being fixed against movement in the ring.

5. A split piston ring provided with a groove extending across the joint thereof, a tongue in said groove, and means for securing said tongue at one side of said joint, said ring having a portion forming the bottom of said groove, when said joint is closed, which portion is integral with the ring at the fixed end of said tongue.

6. A piston ring provided with a tongue and groove joint all portions of which are rigid with said ring.

7. A piston ring provided with a tongue and groove joint, and provided also with a lap joint, said joints being associated with each other at the split or open point in the ring, and all portions of said joint being rigid with said ring.

8. A piston ring provided with a tongue and groove joint, said joint having a rigid tongue which is non-integral with said ring.

Signed by me at Chicago, Illinois, this 9th day of November, 1914.

MICHAEL SETTER.

Witnesses:
 RACHEL J. RICHARDSON,
 ROSE E. SEHNEM.